United States Patent [19]

Johnson

[11] 4,098,843

[45] Jul. 4, 1978

[54] STABILIZED POLYOXYMETHYLENE MOLDING COMPOSITIONS

[75] Inventor: Robert William Johnson, Wilmington, Del.

[73] Assignee: E. I. Du Pont de Nemours and Company, Wilmington, Del.

[21] Appl. No.: 752,803

[22] Filed: Dec. 20, 1976

[51] Int. Cl.² .................................................. C08L 77/00
[52] U.S. Cl. ........................... 260/857 F; 260/857 L; 260/857 UN; 260/857 PE; 260/857 PG
[58] Field of Search ...................................... 260/857 F

[56] References Cited

U.S. PATENT DOCUMENTS

| | | | |
|---|---|---|---|
| 3,235,624 | 2/1966 | Green | 260/857 F |
| 3,288,885 | 11/1966 | Green | 260/857 F |
| 3,459,709 | 8/1969 | Ackermann | 260/857 F |
| 3,642,940 | 2/1972 | Burg | 260/857 F |

*Primary Examiner*—Paul Lieberman

[57] ABSTRACT

A stabilized molding composition comprising an admixture of a minor portion of a dispersion of polyamide in a carrier resin and a major portion of polyoxymethylene, wherein the melting or glass transition temperature of the polyamide is higher than the melting temperature of the polyoxymethylene, and a process for preparing these compositions.

8 Claims, No Drawings

STABILIZED POLYOXYMETHYLENE MOLDING COMPOSITIONS

BACKGROUND OF THE INVENTION

Polyoxymethylene homopolymers and copolymers are used for a wide variety of molded articles. In the preparation of polyoxymethylene molding compositions, minor proportions of polyamide are frequently admixed with the polyoxymethylene to improve the polymer stability during molding and extrusion operations.

While the addition of polyamides to oxymethylene polymers has provided excellent melt stability, these stabilizing components can separate from the oxymethylene polymer to a limited extent, resulting in a residue on molding equipment which must periodically be removed after many molding cycles. Previous attempts to reduce or eliminate this mold deposit for oxymethylene polymers have met with limited success.

SUMMARY OF THE INVENTION

The instant invention provides improved polyoxymethylene compositions which exhibit markedly reduced mold deposit during processing.

Specifically, the instant invention provides a stabilized molding composition comprising an admixture of
(a) a major portion of oxymethylene polymer, and
(b) a minor portion of a dispersion of polyamide in a carrier resin, the polyamide being present in the carrier resin as particles of no greater than about 5 microns and the melting temperature of the semi-crystalline polyamide or the glass transition temperature of the amorphous polyamide being higher than the melting temperature of the oxymethylene polymer.

There is further provided, in accordance with the instant invention, a process for the preparation of the above composition by blending the polyamide and the carrier resin in the required quantities and then admixing the dispersion of the polyamide in the carrier resin with oxymethylene polymer.

DETAILED DESCRIPTION OF THE INVENTION

The oxymethylene polymers which can be used in the instant invention include a wide variety of homopolymers and copolymers known in the art. These polymers are generally addition polymers of formaldehyde in which the polymer chain, exclusive of the terminal portions of the chain, is a series of methylene to oxygen linkages of the general formula —$(CH_2—O)_n$— in which $n$ is an integer of at least 500. The polymer chain can also comprise moieties of the general formula

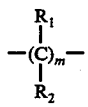

wherein $m$ is an integer of 1 to 5 and $R_1$ and $R_2$ are inert substituents which will not cause undesirable reactions in the polymer. Such additional components of the polymer chain are present in a minor proportion of the repeating units, preferably less than 40 percent and especially in less than 5 percent of the oxymethylene repeating units.

The polyamide stabilizer used in the instant invention can vary widely within the required melting and glass transition temperature characteristics. The melting temperature of a semi-crystalline polyamide should be at least about 25° C higher than the melting temperature of the oxymethylene polymer into which it is incorporated. For amorphous polyamides, the glass transition temperature should be at least about 5° C higher than the melting temperature of the oxymethylene polymer. The melting temperature is measured by differential scanning calorimetry. In general, the semi-crystalline polyamide melting temperature should be higher than about 200° C, and preferably higher than about 240° C.

The polyamides, within the above limitations, can vary widely in composition and molecular weight. They are selected from the many macromolecular polyamides known in the art in which carboxamide linkages

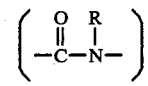

form an integral part of the polymer chain and which upon hydrolysis yield monomeric compounds selected from (1) mixtures of dicarboxylic acids and diamines and (2) omega - aminomonocarboxylic acids. These polyamides preferably have carboxamide linkages in which R is hydrogen, alkyl or alkoxy. The molecular weight of the polyamides can vary widely, with degrees of polymerization ranging about from 50 to 500.

The particular polymeric carrier resin into which the stabilizing polyamide is dispersed should be selected to melt at or below the processing temperature of the oxymethylene polymer and be inert to the oxymethylene polymer. The processing temperature is typically in the range of about from 170° to 240° C., and preferably about from 190° to 220° C. In addition, for satisfactory preparation of the polyamide dispersion, the carrier resin should have a decomposition temperature higher than the melting temperature of the polyamide. Within these guidelines, a wide variety of specific carrier resins can be used, as will be evident to those skilled in the art. These include, for example, polyethylene and copolymers of ethylene with methyl acrylate, ethyl acrylate, vinyl acetate, acrylonitrile, carbon monoxide, or methyl methacrylate, and especially ethylene/methyl acrylate copolymers containing about from 15 to 30 weight percent methyl acrylate and having a melt index of about from 0.5 to 100, and preferably about from 2 to 20. Still other materials which can be used as the carrier resin include methacrylate and acrylate polymers, such as polymethyl methacrylate containing about from 4 to 15 percent ethyl acrylate, copolyesters, polyether-esters, polystyrene, styrene/acrylonitrile copolymers, polyethylene oxide and mixtures of two or more of such polymers.

In the preparation of the instant compositions, the polyamide and the carrier resin are first blended at a temperature above the melting temperatures of both the polyamide and the carrier resin. These components are generally blended in a high shear mixing device of the type known in the art, to disperse the polyamide in the carrier resin as fine particles. The polyamide should be subdivided to a particle size less than about 5 microns, and preferably less than about 2 microns. The polyamide/carrier resin blend should contain about from 10 to 50 weight percent polyamide, and preferably about from 25 to 40 weight percent.

Any convenient apparatus can be used for the admixture of the carrier resin and polyamide stabilizer, so long as the required small particle size of the dispersed polyamide is obtained. In one preferred blending procedure, polyamide and carrier resin granules are first dry blended and then melt extruded in a high shear twin screw extruder, followed by cutting the extruded strands.

The polyamide/carrier resin blend is then admixed with oxymethylene polymer at a temperature above the melting temperature of both the oxymethylene polymer and the carrier resin while below the melting temperature of the polyamide, to obtain a substantially uniform dispersion of the polyamide throughout the oxymethylene polymer. The quantity of the polyamide/carrier resin blend used will vary depending upon the particular oxymethylene polymer used and the degree of stability desired. However, in general, the polyamide/carrier resin comprises about from 0.1 to 30 percent, and preferably about from 0.2 to 5 percent by weight of the final product.

Various additives, such as pigments, fillers, antioxidants, and the like, can also be included in the compositions of the instant invention at various stages in the preparation. For example, a compatibilizing agent can be incorporated into the blend of polyamide and carrier resin, generally comprising about from 0.5 to 30 weight percent of the polyamide/carrier resin dispersion. When an ethylene polymer or copolymer is used as the carrier resin, a variety of compatibilizing agents can be used to advantage, including an ethylene copolymer of acrylic or methacrylic acid; such ethylene copolymers partially neutralized with alkali or alkaline earth metals such as zinc; graft copolymers of such partially neutralized compounds with low molecular weight polyamide; as well as ethylene-propylene polymers thermally grafted with compounds such as fumaric acid, maleic anhydride, and ethyl hydrogen maleate. When the carrier resin is a methacrylate or acrylate polymer, particularly suitable compatibilizing agents include methacrylate or acrylate copolymers containing acidic or basic functional groups.

The compositions of the instant invention can be used in the fabrication of a wide variety of shaped articles by molding. The incorporation of the stabilizing component as described substantially reduces or eliminates mold deposit in injection molding machines previously found objectionable in some stabilized oxymethylene polymers.

The invention is further illustrated by the following specific examples, in which parts and percentages are by weight unless otherwise indicated.

EXAMPLE 1 AND CONTROL EXAMPLES A AND B

A dry polyamide/carrier resin blend was prepared from 16 parts of an intermediate molecular weight polyhexamethylene adipamide and 84 parts of a copolymer with a melt index of 9 which consisted of 79 percent ethylene and 21 percent methyl acrylate. The dry blend was melted and intensively mixed by extrusion using a 28 mm co-rotating twin screw extruder. The melt temperature was controlled in the range of 275°–285° C. The extruded strands were pulled through a water quench tank, blown with air to remove surface water, and fed into a cutter. The resulting granules were dried in a vacuum oven at 60° C. for 10 hours.

To determine the particle size distribution of the polyamide in the blend, several granules were placed in a vial containing toluene capable of dissolving the ethylene copolymer carrier resin without dissolving the polyamide. Optical microscopy of the resulting suspension showed all the polyamide particles to be about 1–2 microns in diameter.

In all examples, blends were prepared using polyoxymethylene (POM) homopolymer with acetate end groups and a number-average molecular weight of about 40,000. The polyoxymethylene contained 0.13 weight percent of 2,2'-methylene-bis-(6-tertiary-butyl-4-methylphenol) anti-oxidant. In Example 1 the dry blend comprised 4.75 weight percent of the polyamide/carrier resin blend prepared above, the remainder of the blend being POM containing antioxidant as above. In Control Examples A and B, similar blends were prepared, but without the polyamide/carrier resin stabilizer. In Control Example A no stabilizer was used, while in Control Example B, 0.75 weight percent of a low melting polyamide stabilizer (66/610/6 terpolymer) was used instead of the polyamide/carrier resin blends of the instant invention.

The dry blends were melted and mixed by extrusion using a 2-inch diameter single screw extruder equipped with a die having two 3/16-inch diameter holes. Melt temperatures were 205°–220° C. The extruded strands were pulled through a short water quench, blown with air to remove surface water, and fed into a cutter. The resulting hot granules were cooled under nitrogen to yield a product suitable for test without further treatment.

The thermal stability of the blends was determined by measuring the volume of gas evolved at 231° C. A 1 gram sample was heated at 231° C for 20 minutes in a calibrated syringe under a nitrogen atmosphere. The volume of gas evolved during the 5-minute to 20-minute interval was used as a measure of thermal stability, indicated as $SI_{231}$. The Tensile Strength and elongation of Example 1 and Control Example B were also determined, and the results reported in Table 1.

The data reveal that the high melting polyamide predispersed in a carrier resin is as effective as the 66/610/6 terpolymer in stabilizing polyoxymethylene. Furthermore, since the high melting polyamide of the present invention is present as small particles (1–2 microns), the elongation or toughness of the polyoxymethylene is not impaired.

The polyoxymethylene mixtures were examined for their tendency to generate mold deposit during injection molding. A reciprocating screw injection molding machine was fitted with a four cavity mold having insulated runners and pin-point gates. Mold deposit was monitored in the two center-gated cavities which produced parts weighing 0.7 grams. Using typical molding conditions, deposits developed with the resin of Control Example B on the surface of the cavity around the gate so that a corresponding surface depression on the molded parts was noticed after 200 cycles. With the polyoxymethylene blends of the present invention, containing the high melting polyamide/carrier resin stabilizer, no deposit was observed, even after 20,000 cycles.

Polyoxymethylene resins prepared in accordance with the above procedures were further tested for molding properties using a single cavity mold which was designed specifically to be a sensitive tool for evaluation of mold deposit performance. The four-tiered step shaped cavity had a pin-point gate perpendicular to the top surface and produced 50 gram parts. Gate diameter was 30 mil (0.76 mm) and wall thickness of the part was 70 mil (1.8 mm). Using a 14 ounce reciprocating screw injection molding machine and standard molding conditions, the resin of Control Example B, with a low melting stabilizer, developed deposits on the surface of the cavity around the gate after only one cycle. A correpsonding surface depression occurred on the molded parts. Resins stabilized by the high melting polyamide/carrier resin systems showed no deposits after 300 cycles.

EXAMPLES 2–8 AND CONTROL EXAMPLES C–D

Polyamide/carrier resin blends were prepared according to the procedure of Example 1 using the components and proportions summarized in Table 2. Fine dispersions of polyhexamethylene adipamide were obtained using a wide variety of carrier resins, including ethylene copolymers with methyl acrylate, vinyl acetate, ethyl acrylate; polymethyl methacrylate; and polyether-ester resins. Compatibilizing agents containing reactive functional groups or carrier resins containing low concentrations of such functional groups improved the degree of dispersion of the high melting polyamide. With such compatibilized blends, the loading of polyamide in the preblend could be substantially increased while maintaining excellent polyamide dispersion. In Control Example C, a blend was prepared using polyamide granules and a methyl methacrylate copolymer with no compatibilizing agent.

The polyamide/carrier resin blends were admixed with polyoxymethylene using the general procedure of Example 1. In control Example D, no stabilizer was incorporated into the polyoxymethylene mixture.

The tensile strength, percent elongation, and thermal stability of the various polyoxymethylene mixtures were determined. The thermal stability was measured, in some cases, at 231° C as above. In other cases, the thermal stability, indicated as $SI_{259}$ was measured by heating a 0.5 gram sample at 259° C for 30 minutes in a calibrated syringe under a nitrogen atmosphere. The volume of gas evolved during the 5-minute to 30-minute interval was used as a measure of thermal stability.

The results of the testing are reported in Table 3. The data in Table 3 demonstrate that the high melting polyamide/carrier resin systems are effective stabilizers. The use of compatibilizing agents allows higher loading of polyamide in the preblend and lower loadings of the carrier resins in polyoxymethylene which in turn leads to less effect of the carrier resin on physical properties. The methacrylate carrier resins result in substantially no drop of tensile strength relative to controls. The blend of nylon granules with uncompatibilized methyl methacrylate carrier resin could not be dispersed uniformly in polyoxymethylene, giving fibrous particles.

TABLE 1

| Example | Stabilizer | Tensile Strength | % Elongation | Stability $SI_{231}$ |
|---|---|---|---|---|
| 1 | Polyamide/Carrier Blend | 9050 | 41 | 5.9 |
| Control A | — | — | — | 28.3 |
| Control B | Polyamide Terpolymer | 9980 | 41 | 6.0 |

TABLE 2

| Example | Carrier Resin | | Compatibilizing Agent | % 66 Nylon | % Carrier Resin | % Compatibilizing Agent | Nylon Particle Size, Microns |
|---|---|---|---|---|---|---|---|
| 2 | E/MA (79/21) | MI 9 | E/MAA-partially Zn neutralized | 25 | 73 | 2 | ≦1 |
| 3 | E/VA/MAA (74/25/1) | MI 6 | — | 25 | 75 | 0 | ≦2 |
| 4 | E/VA (72/28) | MI 6 | E/MAA-partially Zn neutralized | 33 | 66 | 1 | ≦2 |
| 5 | E/EA (82/18) | MI 6 | E/MAA-partially Zn neutralized | 37.5 | 62.2 | 0.25 | ≦2 |
| 6 | MMA/EA (87/13) | | MMA/MAA (99/1) | 33 | 52 | 15 | ≦2 |
| 7 | MMA/EA (87/13) | | MMA/DEAEMA (80/20) | 33 | 57 | 10 | ≦1 |
| 8 | 4GT/PTMEGT (33/67) | | — | 25 | 75 | 0 | <1 |
| Control C | MMA/EA (87/13) | | — | 33 | 67 | 0 | Fibrous |

E = ethylene
MA = methyl acrylate
MAA = methacrylic acid
VA = vinyl acetate
EA = ethyl acrylate
MMA = methyl methacrylate
DEAEMA = N,N-diethylaminoethyl methacrylate
T = terephthalic acid
4G = 1,4-butanediol
PTMEG = polytetramethylene ether glycol

TABLE 3

| Example | Carrier Resin Type | Total Additive Loading, % (0.75% Polyamide) | Tensile Strength psi | % Elongation | Thermal Stability $SI_{231}$ | Thermal Stability $SI_{259}$ |
|---|---|---|---|---|---|---|
| 2 | Compatibilized E/MA | 3.0 | 9510 | 36 | — | 11.1 |
| 3 | E/VA/MAA terpolymer | 3.0 | 9550 | 36 | — | 10.9 |
| 4 | Compatibilized E/VA | 2.25 | 9820 | 42 | — | — |
| 5 | Compatibilized E/EA | 2.0 | 9710 | 45 | — | — |
| 6 | Compatibilized MMA/EA | 2.25 | 9940 | 43 | 8.6 | 17.6 |
| 7 | Compatibilized MMA/EA | 2.25 | 9950 | 45 | 7.7 | 12.3 |
| 8 | 4GT/PTMEGT | 3.0 | 9590 | 48 | — | 11.2 |
| Control B | None | 0.75* | 9980 | 41 | 6.0 | 9.9 |
| Control C | MMA/EA | 2.25 | Fibrous nylon | | poor dispersion, not molded | |
| Control D | — | — | — | — | — | 30 |

*66/610/6 terpolymer

I claim:

1. A stabilized molding composition consisting essentially of an admixture of
   (a) a major portion of oxymethylene polymer, and
   (b) a minor portion of a dispersion of polyamide in a carrier resin, the polyamide comprising about from 10 to 50 wt. % of the dispersion and being present in the carrier resin as particles no greater than about 5 microns; the carrier resin being inert to the oxymethylene polymer and having a melting point at or below the processing temperature of the oxymethylene polymer; and the melting temperature of the semi-crystalline polyamide or the glass transition temperature of the amorphous polyamide being higher than the melting temperature of the oxymethylene polymer.

2. A molding composition of claim 1 wherein the polyamide is semi-crystalline and has a melting temperature of at least about 25° C higher than the melting temperature of the oxymethylene polymer.

3. A molding composition of claim 1 wherein the polyamide is amorphous and has a glass transition temperature at least about 5° C. higher than the melting temperature of the oxymethylene polymer.

4. A stabilized molding composition of claim 1 wherein the polyamide has a particle size of less than about 2 microns.

5. A stabilized molding composition of claim 1 wherein the carrier resin is selected from the group consisting of ethylene polymers and copolymers.

6. A stabilized molding composition of claim 1 wherein the polyamide/carrier resin dispersion comprises about from 0.1 to 30 weight percent of the stabilized molding composition.

7. A stabilized molding composition of claim 1 wherein the polyamide/carrier resin dispersion further comprises about from 0.5 to 30 percent, by weight of the dispersion of a compatibilizing agent.

8. A process for the preparation of a stabilized molding composition which comprises
   (a) dispersing a polyamide in a carrier resin by blending, at a temperature above the melting temperature of the carrier resin and the melting temperature of semi-crystalline or the glass transition temperature of an amorphous polyamide with shear mixing to subdivide the polyamide to a particle size of less than about 5 microns, and in quantities such that the polyamide comprises about from 10 to 50 wt. % of the resulting polyamide/carrier resin dispersion; and
   (b) admixing a minor portion of the resulting polyamide/carrier resin dispersion with a major portion of oxymethylene polymer at a temperature above the melting temperature of both the carrier resin and the oxymethylene polymer.

* * * * *